United States Patent Office 3,044,935
Patented July 17, 1962

3,044,935
PURIFICATION OF CRUDE CARZINOPHILIN
Hideo Kamada, Hofu-shi, Shigetoshi Wakaki, Tokyo, Keitaro Tomioka, Nagaizumimura, Sunto-gun, Shizuoka-ken, Satoshi Ueyama, Hofu-shi, and Keizo Uzu and Hirofuto Marumo, Nagaizumimura, Sunto-gun, Shizuoka-ken, Japan, and Yasuo Fujimoto, Stanford, Calif., assignors to Kyowa Hakko Kogyo Kabushiki Kaisha, Tokyo, Japan, a corporation of Japan
No Drawing. Filed July 31, 1958, Ser. No. 752,208
10 Claims. (Cl. 167—65)

The present invention relates to a method for producing highly pure crystallized carzinophilin having an anti-tumor activity. More particularly, the present invention is concerned with a method for producing highly pure crystallized carzinophilin which comprises adding an alcohol having one to five carbon atoms into a crude free carzinophilin solution in an organic solvent to effect precipitation, standing the mixture with cooling to complete crystal formation and recovering highly pure crystallized carzinophilin from the said mixture.

As is well known, carzinophilin is a substance having an anti-tumor activity and is prepared by microbiological fermentation under a proper condition, using *Streptomyces sahachiroi* (a living culture of this microorganism has been deposited at Northern Regional Research Laboratory at Peoria, Illinois, and has been assigned the accession number, NRRL 2485) discovered by Dr. Hata et al, in Kitasato Laboratories, Japan (see "The Journal of Antibiotics," vol. VII (1954), No. 4, Series A, pages 107 to 112, published by Japan Antibiotics Research Association, Tokyo, Japan). It has also been known that carzinophilin is an unstable substance which is difficult to crystallize. In other words, carzinophilin, soluble in such alcohols as methanol, ethanol and butanol, is rapidly decomposed in these solvents, thus losing its anti-tumor activity.

We have now found a novel method for producing highly pure crystallized carzinophilin, the said method being unexpected from the properties of carzinophilin described above. Therefore one object of the present invention is to provide a method for preparing highly pure crystallized carzinophilin retaining anti-tumor activity. Another object of the present invention is to provide a method for producing highly pure crystallized carzinophilin in good yield. Other objects will be apparent from the descriptions and claims which follow.

According to the present invention, as specified hereinafter, a carzinophilin solution in an organic solvent is combined with alcohols to produce a stable and highly pure crystalline carzinophilin without decomposition by alcohols. Such facts that carzinophilin is crystallized out by adding alcohols to a carzinophilin solution in an organic solvent, and that carzinophilin thus produced without decomposition by alcohols increases its stability are unexpected from the properties of carzinophilin which are presently known, and they should be understood as grounded on the peculiarity of carzinophilin. Carzinophilin, as mentioned above, has a strong anti-tumor activity, but the fact that it has little stability is a deterrent from manufacturing and therapeutic application. It should therefore be noted as industrially valuable that the production of stable and highly pure crystalline carzinophilin has now been accomplished.

According to the present invention a free carzinophilin solution in an organic solvent is used as the starting material. Organic solvents used in the present invention, in general, are water-immiscible and include halogenated aliphatic hydrocarbons, such as chloroform and dichloroethylene, aromatic hydrocarbons, such as benzol, toluol and xylol, esters, such as amyl acetate and butyl acetate, and ethers. However, in commercial use halogenated aliphatic hydrocarbons, such as chloroform and dichloroethylene; esters, such as amyl acetate and butyl acetate; and benzol are practicable. Carzinophilin, being an acidic substance, is dissolved out from a weakly acidic aqueous solution into the above said organic solvents and alternately from the above said organic solvents into a weakly alkaline aqueous solution. A salt of carzinophilin may be used in preparing a free carzinophilin solution which is the starting material for the present invention.

In the present invention the term of "a free carzinophilin solution" should be understood as being dissolved out from a weakly acidic aqueous solution into an organic solvent, or as being the residue obtained by vaporization of the solvent from the aforesaid solution dissolved in another solvent. The free carzinophilin solution is adjusted to a concentration suitable for crystallization by evaporation or dilution before the succeeding procedures.

The present invention consists also in a formation of crystal in the manner of precipitation by adding alcohols to a free carzinophilin solution. For precipitation various solvents other than alcohols may be used. However, as determined from our experimental work, such solvents as used to effect the precipitation of carzinophilin in valuable form, in good yield and in pure crystallized form are limited to alcohols. Aliphatic or aromatic alcohols may be used; aliphatic alcohols having one to five carbon atoms are preferred for industrial application. Addition of alcohols to the free carzinophilin solution may be carried out at room temperature. Alcohols added to the free carzinophilin solution in an organic solvent are to be used in amounts of one to ten times that of the said free carzinophilin solution which has been adjusted to a concentration suitable for crystallization. When alcohols are used in an amount less than that specified, a crystal is not completely formed, thus decreasing the crystal yield. When alcohols are used in an amount more than the above specified, however, not only crystal but also impurities are deposited and decomposition of the crystal occurs. After addition of alcohols, the mixture is cooled and allowed to stand with cooling to complete precipitation, that is crystal formation. The period during which the said mixture is allowed to stand is short so as to avoid decomposition of carzinophilin, which is relatively unstable in alcohols.

The crystallized precipitate thus produced is from five to fifteen times as pure as the starting crude carzinophilin, while its anti-tumor activity and stability is also highly increased and the degree of colorization is decreased.

If carzinophilin product in the form of a salt is needed, the product may be prepared by dissolving the crystallized free carzinophilin in a carzinophilin soluble solvent, dissolving out the said carzinophilin into a weakly alkaline aqueous solution and then freezing to dryness.

The present invention will be illustrated in greater detail by the following specific examples. It is understood, however, that the present invention in its broader aspects is not limited thereto.

*Example 1*

In order to remove the ether soluble impurities, one gram of crude powder of free carzinophilin (purity; 36,000μ./mg.) was shaken twice with 20 ml. of ether. Insoluble substance was recovered by filtration and dissolved in 100 ml. of benzene. The resulting solution was condensed to 10 ml. by vacuum evaporation, and then combined with 50 ml. of methanol. The mixture thus obtained was cooled and allowed to stand. White crystals appeared and were recovered by filtration. There were obtained 360 mg. (purity; 70,000μ./mg.) having a melting point of 207° C. (decomp.). Yield 70%.

Example 2

600 ml. of an aqueous solution (125,000μ./ml.) containing carzinophilin salt was adjusted at pH 5.8 by addition of phosphoric acid. This solution was extracted three times with 100 ml. of ethyl acetate. The obtained ethyl acetate solution of carzinophilin was condensed to approximately 20 ml. by vacuum evaporation and then combined with 50 ml. of ethanol. The mixture thus obtained was cooled and allowed to stand. White crystals appeared and were recovered by filtration. 500 mg. (purity; 72,000μ./mg.), having a melting point of 210° C. (decomp.) were obtained. Yield 48%.

Example 3

1200 ml. of an aqueous solution (283,000μ./ml.) containing carzinophilin salt is adjusted to pH 5.8 by addition of hydrochloric acid. This solution was extracted three times with 200 ml. of chloroform. The obtained carzinophilin-chloroform solution was condensed to approximately 50 ml. by vacuum distillation, and then combined with 200 ml. of amyl alcohol. The mixture thus obtained was cooled and allowed to stand with cooling. White crystals appeared and were recovered by filtration. 2.5 gr. (purity; 70,000μ./mg.) having a melting point of 210° C. (decomp.) were obtained. Yield 51%.

One hundred milligrams of free carzinophilin crystal obtained as above were dissolved in 50 ml. of benzene, and the resulting solution was combined with 100 ml. of water and adjusted to pH 9.0 by addition of a sodium hydroxide solution. This solution was extracted three times by shaking with a sodium hydroxide solution. The aqueous layer was separated and frozen to dryness. The white crystals of carzinophilin sodium salt having a purity of 45,000μ./mg. were recovered in an amount of 130 mg. Yield 75%.

In the same manner as above calcium hydroxide was used in place of sodium hydroxide, and 150 mg. of white crystallized powder of carzinophilin salt having a purity of 50,000μ./mg. was produced.

Comparison of the properties of free carzinophilin crystal, crystalline carzinophilin sodium salt and crystalline carzinophilin calcium salt with those of crude carzinophilin sodium salt and crude carzinophilin calcium salt which are not subjected to crystallization of the present invention, is set forth in the following table.

|  | Product by conventional method | | Products by a method in the present invention | | |
| --- | --- | --- | --- | --- | --- |
|  | Na salt | Ca salt | Na salt | Ca salt | Free |
| Purity (μ./mg.) | 10,000 | 20,000 | 45,000 | 50,000 | 80,000. |
| Stability,[1] percent | 30 | 80 | 60 | 85 | 100. |
| Anti-tumor activity,[2] days | 10 | 3 | More than 10. | More than 10. | More than 10. |
| Color | Yellow | Pale yellow. | White | Pure white. | Pure white. |

[1] Rate of remaining potency when heated at 80° C. for one hour.
[2] Average number of prolonged life of Yoshida sarcoma innoculated rat injected with carzinophilin product in the ratio of 500 μ. per kilogram of body weight.

As illustrated in the above table, the crystallized carzinophilin obtained by the present invention has an increasingly higher purity than carzinophilin produced by conventional method, while the anti-tumor activity and stability of the crystallized carzinophilin according to the present invention are increased and the degree of colorization is decreased.

What we claim is:

1. A method for purifying carzinophilin which comprises (a) adding a lower alkanol having one to five carbon atoms to a crude free carzinophilin solution in a water-immiscible organic solvent selected from the group consisting of chloroform, dichloroethylene, benzol, toluol, xylol, ethyl acetate, butyl acetate, amyl acetate and ether until a precipitate is formed, (b) standing the resulting mixture with cooling to complete crystallization of carzinophilin and (c) recovering the crystalline carzinophilin, the said crude free carzinophilin solution in a water-immiscible organic solvent being a member selected from the group consisting of (1) crude free carzinophilin solution dissolved out from weakly acidic aqueous solution into the said water-immiscible organic solvent and (2) crude free carzinophilin solution of the residue obtained by evaporation of the solvent from the afore-said solution, said last-mentioned carzinophilin solution being in a water-immiscible organic solvent different from that present in step (a).

2. A method for purifying carzinophilin which comprises adding a lower alkanol having one to five carbon atoms to a free carzinophilin solution in benzene to effect precipitation, allowing the mixture to stand with cooling to complete crystallization of carzinophilin and recovering the crystalline carzinophilin from the said mixture.

3. A method for purifying carzinophilin which comprises adding a lower alkanol having one to five carbon atoms to a free carzinophilin solution in chloroform to effect precipitation, allowing the mixture to stand with cooling to complete crystallization of carzinophilin and recovering the crystalline carzinophilin from the said mixture.

4. A method for purifying carzinophilin according to claim 1 in which the said alkanol is methanol.

5. A method for purifying carzinophilin according to claim 1 in which the said alkanol is ethanol.

6. A method for purifying carzinophilin according to claim 1 in which the said alkanol is amyl alcohol.

7. A method for producing highly pure carzinophilin salt which comprises dissolving highly pure crystalline carzinophilin prepared by a method according to claim 1 in a solvent therefor and dissolving out the carzinophilin into an weakly alkaline aqueous solution.

8. A process for purifying carzinophilin which comprises: (a) adding until a precipitate is formed a lower alkanol to a crude free carzinophilin solution dissolved out from a weakly acidic aqueous solution into a water-immiscible solvent selected from the group consisting of chloroform, dichloroethylene, benzol, toluol, xylol, ethyl acetate, butyl acetate, amyl acetate and ether, (b) subjecting the resulting product to cooling to complete crystallization of carzinophilin, and (c) recovering crystalline carzinophilin.

9. A process for purifying carzinophilin which comprises: (a) evaporating solvent from a weakly acidic aqueous carzinophilin solution, (b) dissolving the resulting residue in a water-immiscible solvent selected from the group consisting of chloroform, dischloroethylene, benzol, toluol, xylol, ethyl acetate, butyl acetate, amyl acetate and ether, (c) adding until a precipitate is formed a lower alkanol to the solution formed in step (b), (d) subjecting the resulting product to cooling to complete crystallization of carzinophilin and (e) recovering crystalline carzinophilin.

10. A process for purifying carzinophilin which comprises: (a) adding a lower alkanol to a water-immiscible organic solvent solution of crude free carzinophilin until a precipitate is formed, said solvent being a member selected from the group consisting of chloroform, dichloroethylene, benzol, toluol, xylol, ethyl acetate, butyl acetate, amyl acetate and ether, (b) subjecting the resulting product to cooling to complete crystallization of carzinophilin and (c) recovering crystalline carzinophilin.

References Cited in the file of this patent
UNITED STATES PATENTS
2,633,445    Marsh et al. ---------- Mar. 31, 1953